US006991677B2

(12) United States Patent
Tanabe et al.

(10) Patent No.: US 6,991,677 B2
(45) Date of Patent: Jan. 31, 2006

(54) TITANIUM DIOXIDE-CALCIUM CARBONATE COMPOSITE PARTICLES

(75) Inventors: Katsuyuki Tanabe, Nishitama-gun (JP); Kouhei Mitsuhashi, Nishitama-gun (JP); Takehiko Yoshida, Nishitama-gun (JP)

(73) Assignee: Nittetsu Mining Co., Ltd., Tokyo (JP)

( * ) Notice: Subject to any disclaimer, the term of this patent is extended or adjusted under 35 U.S.C. 154(b) by 321 days.

(21) Appl. No.: 10/312,832

(22) PCT Filed: Jul. 3, 2001

(86) PCT No.: PCT/JP01/05748

§ 371 (c)(1),
(2), (4) Date: Jan. 3, 2003

(87) PCT Pub. No.: WO02/02462

PCT Pub. Date: Jan. 10, 2002

(65) Prior Publication Data

US 2003/0121451 A1    Jul. 3, 2003

(30) Foreign Application Priority Data

Jul. 4, 2000  (JP) ............................. 2000-202813

(51) Int. Cl.
*C09C 1/36* (2006.01)

(52) U.S. Cl. .................... 106/436; 106/499; 428/402; 428/403; 423/430; 423/431; 423/432; 423/610; 423/611; 423/612; 423/613; 423/614; 423/615; 423/616; 162/135; 162/181.2; 162/181.4; 162/181.5

(58) Field of Classification Search ................ 105/499; 428/402, 403; 162/9, 10, 181.2, 181.4, 181.7, 162/135, 181.5; 106/436, 499; 423/430–432, 423/610–616
See application file for complete search history.

(56) References Cited

U.S. PATENT DOCUMENTS

| 2,170,800 | A | * | 8/1939 | Barton ........................ 106/449 |
| 3,373,134 | A | | 3/1968 | Yasui et al. |
| 3,528,838 | A | * | 9/1970 | Brixner ....................... 106/449 |
| 3,832,206 | A | * | 8/1974 | Libera et al. ................ 106/449 |
| 4,028,173 | A | * | 6/1977 | Olson ....................... 162/181.2 |

FOREIGN PATENT DOCUMENTS

JP    2-169795  A    6/1990

(Continued)

OTHER PUBLICATIONS

Derwent—Acc-No. 2004-307514 (Abstract of JP 2003-137548 A).*

(Continued)

*Primary Examiner*—J. A. Lorengo
*Assistant Examiner*—S. S. Manlove
(74) *Attorney, Agent, or Firm*—Sughrue Mion, PLLC (57) ABSTRACT

Titanium dioxide-calcium carbonate composite particles capable of realizing characteristic properties inherent in titanium dioxide such as a high opacity, a process for producing the same, and a complex composition or complex incorporated with the same are provided. The composite particles were prepared by adding titanium dioxide particles having an average particle diameter of 0.1 to 0.5 μm in a carbonation step, typically a step of introducing a gaseous mixture of carbon dioxide and air into a calcium hydroxide slurry with stirring, to conduct a carbonation, and continuing the reaction till pH of the slurry becomes 7 by continuous introduction of the gaseous mixture. Moreover, by incorporating the formed composite particles, complexes such as coatings and paints for paper making or composite materials such as paper, plastic molded materials, and rubber molded materials are produced.

13 Claims, 2 Drawing Sheets

FOREIGN PATENT DOCUMENTS

| | | | |
|---|---|---|---|
| JP | 9-156923 | A | 6/1997 |
| JP | 2000-80300 | A | 3/2000 |
| JP | 2001-114514 | A | 4/2001 |
| JP | 2001-240765 | * | 9/2001 |
| JP | 2001-240765 | A | 9/2001 |

OTHER PUBLICATIONS

Derwent—Acc-No. 2004-147070 (Abstract of JP 2003-176131 A).*

* cited by examiner

TITANIUM DIOXIDE-CALCIUM CARBONATE COMPOSITE PARTICLES

TECHNICAL FIELD

The present invention relates to titanium dioxide-calcium carbonate composite particles capable of imparting a high opacity and coloring property, i.e., realizing the characteristic properties inherent in titanium dioxide such as opacity more suitably when the particles are used as a filler or a pigment, and to a process for producing the same. Furthermore, the present invention relates to a complex composition or complex into which the titanium dioxide-calcium carbonate composite particles are incorporated.

More specifically, the present invention relates to titanium dioxide-calcium carbonate composite particles capable of imparting opacity and a good coloring property efficiently as compared with conventional ones in the same amount of titanium dioxide when the particles are incorporated into paper, sheets or molded materials of plastics, or the like, especially in the field of paper making, capable of realizing a low viscosity when the particles are incorporated and, as a result, applicable to high-speed operation, and to a process for producing the same. Furthermore, the present invention relates to a complex composition or complex into which the titanium dioxide-calcium carbonate composite particles are incorporated as a filler or a pigment, for example, a filler for paper making or a coating agent.

BACKGROUND ART

Calcium carbonate includes heavy calcium carbonate obtained by physically pulverizing natural white limestone and synthetic calcium carbonate obtained by chemical precipitation. The former heavy calcium carbonate has a wide particle size distribution and random shapes that are characteristic to physical pulverization as the production process wherein a natural product is pulverized, so that it is impossible to produce particles having a homogeneous particle diameter and uniform in shape.

On the other hand, the latter synthetic calcium carbonate is produced by chemical precipitation, it is possible to control the particle diameter and shape within a certain range. The calcium carbonate thus produced, having a characteristic shape such as spindle-shape, cubic shape, or columnar shape and having a narrow certain particle range, has specific functions and characteristic properties derived from the differences in shape and particle diameter which each calcium carbonate has and is used differently in the fields of paper making and various polymer materials depending on the functions and characteristic properties.

Among these synthetic calcium carbonates, spindle-shape calcium carbonate has a spindle-shape having a major axis of 1 to 4 $\mu$m and a minor axis of 0.2 to 1 $\mu$m (an average diameter on an electron microscope method; the same shall apply to the particle diameters shown below), exhibits a relatively high degree of whiteness and is excellent in economical efficiency, and hence it is used mainly as a filler for paper making in a large amount. On the other hand, not as a filler but as a pigment for use in coating on a surface, use is frequently made of cubic shape calcium carbonate having an average particle diameter of 0.1 to 0.3 $\mu$m or columnar calcium carbonate having a minor axis of 0.1 to 0.3 $\mu$m and a major axis of 0.5 to 2 $\mu$m, which exhibit a good dispersibility.

Recently, in paper making industry, for the purpose of reducing garbage generation and saving transportation cost, the tendency is toward saving weight of paper. The weight saving of paper has been attained by lowering weighing, thinning paper, or reducing an amount of a filler to be incorporated, but along with the weight saving, there arises a problem that opacity of paper decreases and hence a printed part is visible from the opposite side. As measures against the problem, many attempts at enhancing opacity have been made by incorporating various kinds of fillers or providing a special coating layer.

The substances for use as fillers for paper making or pigments to be incorporated into coating layers include kaolin, talc, silica, titanium dioxide, plastic pigments, or the like in addition to synthetic calcium carbonate and heavy calcium carbonate. These substances have different characteristic properties and are used solely or as mixtures depending on the quality required for the paper to be produced. Of these, especially titanium dioxide has the highest refractive index and hence is most effective for enhancing opacity of paper.

With regard to titanium dioxide, as a filler for paper making and a pigment for coating, particles having a particle diameter of 0.1 to 0.5 $\mu$m have been used but they have a property of easily flocculating owing to the influence of the pH of a paper stock and a coating agent, kind and concentration of a chemical agent for paper making to be added. In the case of filling or coating paper with titanium dioxide, the flocculation of titanium dioxide particles results in a heterogeneous distribution of titanium dioxide particles in paper and hence the opacity-enhancing effect inherent in titanium dioxide cannot be sufficiently realized.

Accordingly, when titanium dioxide particles are in a flocculated state, for attaining desired opacity, the amount of titanium dioxide should be necessarily increased, which results in not only disadvantage in cost but also retrogression against weight saving of paper. Especially, since titanium dioxide is expensive and has a large specific gravity as compared with other pigments and filler, it becomes important to achieve desired opacity by using a required minimum amount of titanium dioxide.

On the other hand, when titanium dioxide particles are in a monodispersed state, in the case of using the particles as a filler, fine titanium dioxide particles are difficult to entwine with pulp fibers and tend to drop out to waste water side in a paper making machine, so that yield ratio becomes low. Also, when the particles are included in a coating agent, the fineness of titanium dioxide particles results in increased viscosity of the coating agent, which causes deterioration of high-speed operability.

Therefore, when titanium dioxide is in a monodispersed state, there are also problems that the whole amount of titanium dioxide used cannot contribute to enhancement of opacity of paper owing to the low yield ratio as a filler and desired incorporating amount of titanium dioxide cannot be realized because of the increased viscosity of the coating agent. Under such a circumstance, many researches have been made aiming at enhancement of opacity of paper, wherein the opacity-enhancing effect inherent in titanium dioxide is efficiently utilized, and the following have been proposed.

For example, as pigments capable of enhancing opacity of paper suitably, there are proposed composite powder obtained by fixing a highly shielding pigment such as titanium dioxide onto the surface of an inorganic powder such as talc, calcium carbonate, clay, or kaolin using an organic binder as shown in JP-A-2-242998 and composite particles of silica and titania as shown in JP-A-9-286609.

In addition, JP-A-11-217797 discloses that titanium dioxide whose surface is treated with silica is excellent as a coating pigment for a ultra lightweight coat paper, and in Japanese Patent No. 2942182, a titanium dioxide pigment for paper making excellent in bonding property to pulp is obtained by treating a titanium dioxide surface with aluminum phosphate and alumina and/or magnesium oxide.

Moreover, as technologies of incorporating titanium dioxide into a coated layer of paper, there is proposed a technology of obtaining a printing paper having a light weight and a high opacity by coating a base paper containing needle-shape calcium carbonate having a specific particle diameter as a filler with a coating liquid containing rutile-type titanium dioxide having a specific oil absorbance and a specific particle diameter as in JP-A-7-331595 or a technology or the like of obtaining a coated paper for offset printing having an undercoat layer and a topcoat layer which is excellent in high-speed operability and has a high opacity by employing rutile-type titanium dioxide and calcium carbonate in a specific incorporating composition as a pigment for the topcoat layer as shown in JP-A-2000-54288.

As examples of filling titanium dioxide into paper as a filler, there have been proposed a process for producing a titanium dioxide-filled paper which is a base paper for decorative laminate used for melamine-decorative laminate, tap-decorative laminate, or the like excellent in opacity, wet strength, and yield ratio of titanium dioxide by lowering zeta-potential once with an organic electrolyte between after the addition of wet paper strength additive increasing agent and before the addition of alumina sulfate at the preparation of paper stock as shown in JP-A-8-246389, a filled paper excellent in the balance between optical properties such as opacity and degree of whiteness and physical properties, which is obtained by filling spindle-shape calcium carbonate, columnar calcium carbonate, and titanium dioxide in a predetermined mixing ratio as shown in JP-A-9-217292, and the like.

However, the above technologies of producing a filler and a pigment for paper making or paper which allow suitable enhancement of opacity require complex production processes and use of expensive starting materials, and hence it should be pointed out that industrial application thereof is problematic. Moreover, with regard to the technologies of incorporating titanium dioxide into paper, it is possible to realize opacity-enhancing effect inherent in titanium dioxide to some extent, but the opacity-enhancing function inherent in titanium dioxide is not thoroughly realized.

Furthermore, under the circumstance that further speeding up of a paper making process is required, the technologies are not satisfactory as technologies, which can meet the requirement, for obtaining coating agents incorporated with titanium dioxide. As mentioned above, titanium dioxide exhibits an effect on the enhancement of opacity as a pigment or filler for paper making, but the opacity-enhancing effect is realized at the most because of the flocculation of titanium dioxide particles and low yield ratio thereof. In addition, there is a problem that use of titanium dioxide may result in the increased viscosity of coating agent, which inhibits speeding up of a paper making process.

PROBLEMS TO BE SOLVED

Under such circumstances, as a result of the intensive studies for solving the conventional problems of titanium dioxide, the present inventors have found that titanium dioxide and calcium carbonate can be directly provided in a relatively simple step without any binder which is used in conventional methods. Thereby, the inventors have found that composite particles excellent in opacity and coloring property, which can be suitably used as a pigment, filler, or the like for use in paper making, plastics, rubbers, paint, and the like, can be obtained by combining titanium dioxide and calcium carbonate. Based on the findings, they have accomplished the present invention.

That is, an object of the present invention is to provide titanium dioxide-calcium carbonate composite particles having a high opacity and a high coloring property, i.e., capable of realizing opacity and coloring property efficiently using necessary minimum amount of titanium dioxide, which is suitably used as a pigment, filler, or the like for use in paper making, plastics, rubbers, paint, and the like, and a process for producing the same. Moreover, another object is to provide a complex composition such as a coating agent for paper making, a filler for paper making, a paint, or the like into which the titanium dioxide-calcium carbonate composite particles are incorporated or a complex such as paper which is a molded material in which the composite particles are used.

DISCLOSURE OF THE INVENTION

The present invention provides a titanium dioxide-calcium carbonate composite particle for solving the above problems and a process for producing the same, and a complex composition or complex into which the particle is incorporated, the titanium dioxide-calcium carbonate composite particle being a particle having a high opacity and a high coloring property and comprising a synthetic calcium carbonate particle having directly provided thereon titanium dioxide particles having an average particle diameter of 0.1 to 0.5 $\mu$m.

Moreover, the process for producing a titanium dioxide-calcium carbonate composite particle comprises adding titanium dioxide particles to synthetic calcium carbonate in a carbonation step at a production step of the synthetic calcium carbonate to thereby directly provide the titanium dioxide on the calcium carbonate. Furthermore, the complex compositions or complexes are various compositions such as fillers, coating agents, or paints for paper making comprising the above titanium dioxide-calcium carbonate composite particles or the titanium dioxide-calcium carbonate composite particles produced by the above process, or various forms of molded materials such as paper obtained using the same.

In the present invention, the inventors have found that titanium dioxide particles can be directly provided on calcium carbonate, especially on the surface by adding titanium dioxide particles in the carbonation step without any binder such as an organic binder, and the present invention has been accomplished based on the findings. As a result, when the composite particles for making paper, paints, or plastics as a filler or a pigment are used, the composite particles have a characteristic property of exhibiting no adverse effect such as deterioration or dissolution which is shown in the presence of an organic binder or the like even when they are subjected to a treatment such as heating, hydrolysis, or the like.

Moreover, the composite particles are particles wherein titanium dioxide particles having an average particle diameter of 0.1 to 0.5 $\mu$m are directly provided on the surface of synthetic calcium carbonate particles and which allow an efficient realization of the opacity-enhancing effect inherent in titanium dioxide as compared with a simple mixture. In particular, when the composite particles are applied to paper making, titanium dioxide particles do not flocculate each other in the paper forming step or coating step and can be homogeneously distributed in paper or in a coated layer, so that it is possible to realize more efficiently the opacity-enhancing effect inherent in titanium dioxide added.

Furthermore, since titanium dioxide particles are provided on coarser calcium carbonate particles and both particles are complicated, the composite particles have an effect of solving problems such as low yield ratio caused by the fineness of titanium dioxide particles and viscosity increase which occurs when they are incorporated into a coating agent. By the way, it is a matter of course that the composite particles of the present invention are utilizable in fields other than the above paper making, the fields including plastics, rubbers, paints, and the like. By incorporating the particles into them, opacity is enhanced or coloring property is improved.

BEST MODE FOR CARRYING OUT THE INVENTION

The present invention is descried below in detail including the best mode for carrying out the present invention but, needless to say, the present invention is not limited thereto and is defined according to the description in claims. Specifically, a process for producing titanium dioxide-calcium carbonate composite particles, natures or characteristic properties of the composite particles produced, a composite composition and composite material into which the composite particles are incorporated, and the like are explained, but, needless to say, the present invention is by no means limited thereto and is defined according to the description in claims.

In the titanium dioxide-calcium carbonate composite particles of the present invention, as mentioned above, titanium dioxide particles having an average particle diameter of 0.1 to 0.5 µm are directly provided on the surface of synthetic calcium carbonate particles, that is, the titanium dioxide particles are provided on the surface of synthetic calcium carbonate particles without any binder.

With regard to the titanium dioxide to be used at the production of the composite particles of the present invention, the production method and properties are not particularly limited and various kinds of the compound can be used. For example, rutile-type titanium dioxide and anatase-type titanium dioxide which are industrially produced by sulfuric acid process or chlorine process can be used. The amount of titanium dioxide to be provided is desirably 0.1 part by weight or more based on 100 parts by weight of synthetic calcium carbonate. When the amount is less than 0.1 part by weight, the opacity-enhancing effect inherent in titanium dioxide is hardly realized.

Moreover, with regard to synthetic calcium carbonate which is another constituting component to be used at the production of the composite particles of the present invention, the carbonate can be used without particular limitation and the carbonate is generally used for paper making, such as cubic calcium carbonate having a particle diameter of 0.1 to 0.3 µm, spindle-shape calcium carbonate having a major axis of 1 to 4 µm and a minor axis of 0.2 to 1 µm, and columnar calcium carbonate having a major axis of 0.5 to 2 µm and a minor axis of 0.1 to 0.3 µm can be preferably used.

Among these, since spindle-shape calcium carbonate is capable of most efficiently supporting titanium dioxide and also the carbonate is easily produced and is advantageous in view of the cost as compared with cubic or columnar, it is more preferable to select spindle-shape calcium carbonate as a shape of calcium carbonate.

The titanium dioxide-calcium carbonate composite particles of the present invention are produced by adding titanium dioxide in a carbonation step which is a production step of synthetic calcium carbonate. That is, in the present invention, by adding titanium dioxide particles in a carbonation step as above, the particles are provided on the surface of synthetic calcium carbonate. As a result, in the present invention, the composite particles wherein titanium dioxide particles are fixed on the surface of synthetic calcium carbonate are formed without any binder, which is a characteristic of the present invention.

As the process for producing the synthetic calcium carbonate, a carbonation process wherein calcium carbonate is precipitated by blowing carbon dioxide into calcium hydroxide slurry, a soda ash-lime process wherein calcium chloride is allowed to react with sodium carbonate, a water-treating process wherein calcium hydrogen carbonate is allowed to react with calcium hydroxide, and the like are industrially adopted. In the processes, particle shape and particle diameter can be controlled by regulating the production conditions such as carbonation temperature, carbonation rate, calcium concentration in starting materials, and the like.

The process for producing synthetic calcium carbonate adoptable in the present invention is not particularly limited but it is common and economically most advantageous to employ the carbonation process which uses, as a starting material, quick lime obtained by calcination of limestone abundantly produced in Japan. By the way, the carbonation step in the production of synthetic calcium carbonate is a reaction step wherein, in the carbonation process, for example, calcium ion is allowed to react with carbonate ion or carbon dioxide to form calcium carbonate and, in the other processes for producing calcium carbonate, the step also means a step wherein calcium is allowed to react with carbon dioxide or carbonate ion.

The amount of titanium dioxide to be added in the carbonation step is not particularly limited and may be controlled in consideration of opacity required, weighing, coating amount, and the like for paper. More desirably, it is preferable to use the compound in an amount of 0.1 part by weight or more based on 100 parts by weight of calcium carbonate to be formed. When the amount is less than 0.1 part by weight, the opacity-enhancing effect inherent in titanium dioxide is hardly realized. On the other hand, since there is a limitation of the amount capable of being provided on the surface of synthetic calcium carbonate, a good result is not necessarily obtained even when titanium dioxide is added in an amount exceeding the limitation.

Moreover, with regard to the timing of adding titanium dioxide, it may be before the carbonation or during the carbonation as far as it is before the completion of the carbonation. That is, in the step of forming calcium carbonate through carbonation, by existing titanium dioxide particles in the reaction process, titanium dioxide particles can be fixed onto and directly provided on the surface of calcium carbonate, whereby titanium dioxide-calcium carbonate composite particles of the present invention can be obtained.

However, it is confirmed that the degree of fixation of titanium dioxide onto calcium carbonate particles tends to decrease when the timing of the addition is near to the completion of the carbonation, and therefore, when the amount of titanium dioxide to be provided is, in particular, 50 parts by weight or more based on 100 parts by weight of calcium carbonate, it is desirable to add titanium dioxide before a carbonation rate reaches 95% in the carbonation step. By the way, the carbonation rate herein is represented by the following equation:

Carbonation rate (%)=(calcium weight in calcium carbonate formed by carbonation/total weight of calcium present in reaction system)×100

After the addition of titanium dioxide, the reaction is continued until the carbonation is completed. The completion of the carbonation can be easily detected by measuring pH. For example, in the case of the carbonation process, the slurry is alkaline showing a pH of 11 to 13 owing to the presence of unreacted calcium hydroxide before the carbonation rate reaches 100%, but when the reaction is completed, the pH lowers to around neutral. As above, the titanium dioxide-calcium carbonate composite particles of the present invention are produced wherein titanium dioxide particles having an average particle diameter of 0.1 to 0.5 $\mu$m are provided on synthetic calcium carbonate particles.

In the present invention, the above-mentioned titanium dioxide-calcium carbonate composite particles can be utilized in plastics, rubbers, paints, or the like in addition to the afore-mentioned paper making use for the purpose of improving mainly opacity or coloring degree. A composition containing the titanium dioxide-calcium carbonate composite particles or a molded material formed from the composition for the utilization is the complex composition or the complex of the present invention.

Then, the complex composition or the complex is described in detail taking the most promising paper making use as an example.

When the composite particles of the present invention are utilized in paper making use, they are applicable to both of a filler to be filled into paper and a pigment to be applied on paper, and the filler or coating agent containing the composite particles are the composite composition of the present invention.

The filler for paper making is a substance to be filled into paper for the purpose of improving paper quality, or increasing paper weight and reducing pulp, and it is added into a pulp slurry in a paper stock-preparing step together with chemical agents for paper making, such as a sizing agent, a paper strength additive, and a retention aid. Incorporating rate (filling rate) of the filler varies depending on the kind and quality of paper to be produced, but the rate ranges, in general, from 5 to 30% by weight based on absolute dry weight of paper in the case of paper for printing, and the filler is sometimes filled in a rate of about 90% at the most in the case of inorganic papers such as a flame-resistant paper.

Moreover, the pigment for paper making is a substance to be incorporated into a coating agent which is applied to the surface of paper for the purpose of improving paper quality, especially surface properties. In general, a coating agent is obtained by dispersing a pigment and a binder into water and pigment concentration in the coating agent ranges from about 30% to about 60% by weight.

When the titanium dioxide-calcium carbonate of the present invention is used as a filler for paper making, it is preferable that the composite particles are used as at least part of the filler to be filled and the amount is 1% by weight or more based on inorganic filler. Moreover, when used as a pigment for coating, it is preferable that the composite particles are used as at least part of the pigment to be incorporated in the coating agent and the amount is 1% by weight or more based on inorganic pigment.

By thus using the composite particles as a filler for paper making, higher opacity can be imparted to paper even in the same amount of titanium dioxide as compared with a simple mixture of titanium dioxide and calcium carbonate. It is considered that this is because titanium dioxide can be homogeneously distributed in paper in a paper-forming step without flocculation of titanium dioxide.

Similarly, when used as a pigment for a coating agent, a coated layer capable of realizing efficiently the opacity-enhancing effect of titanium dioxide incorporated can be formed. It is also considered that this is because titanium dioxide can be homogeneously distributed in the coated layer in a coating step without flocculation of titanium dioxide. By the way, the paper filled or coated with the titanium dioxide-calcium carbonate composite particles is one of the composite materials of the present invention.

Furthermore, when used as a filler, since fine titanium dioxide particles (particle diameter of about 0.1 to 0.5 $\mu$m) are provided on larger synthetic calcium carbonate particles (for example, in the case of spindle-shape calcium carbonate, major axis of primary particles of 1 to 4 $\mu$m, aggregated particle diameter of several to over ten $\mu$m), there is an advantage that the yield ratio is improved. Moreover, when used as a pigment, since fine titanium dioxide particles are provided on larger synthetic calcium carbonate particles, it becomes possible to suppress the viscosity increase of a coating agent caused by the fineness of titanium dioxide.

In the above explanation, although the complex composition and complex of the present invention are described taking a paper making use as an example, the composite particles of the present invention can be utilized in fields other than paper making and are effective in uses where opacity and good coloring property are required. As the utilizing modes, plastics, rubbers, paints, and the like may be mentioned as fillers or pigments, wherein an unmolded composition containing the composite particles is the composite composition of the present invention and a material molded using the same such as a plastic case, a plastic film, a plate-shape rubber, a metal with a coated film, or a wood plate with a coated film is the composite material of the present invention. By the way, when the composite particles are utilized in a paint use, it is also possible to prevent precipitation and separation of titanium dioxide, the precipitation and separation being due to a large specific gravity of titanium dioxide particles.

EXAMPLES AND COMPARATIVE EXAMPLES

The present invention is explained below with reference to Examples and Comparative Examples wherein composite particles are produced and Examples and Comparative Examples of complex compositions and complexes utilizing the same, but the present invention is by no means limited thereto and is defined by Claims.

Example 1

Into 1 L of tap water heated to 70° C. was charged 135 g of quick lime for industrial use, and the whole was stirred for 30 minutes to slake the quick lime. Thereafter, slaked residue was removed with a 100 mesh sieve and then tap water was added thereto to prepare 2.0 L of a slaked lime slurry having a concentration of 80 g/L. After the addition of 6.0 g of rutile-type titanium dioxide having an average particle diameter of 0.25 $\mu$m (CR-50 manufactured by Ishihara Sangyo) to the slaked lime slurry, the slurry temperature was controlled to 30° C. and then carbon dioxide was introduced in a rate of 0.35 L/minute to carry out carbonation. The reaction was terminated when pH of the slurry became 7, whereby titanium dioxide-calcium carbonate composite particles were obtained.

When the resulting product was subjected to chemical analysis, the content of titanium dioxide was found to be 2.5% by weight (2.6 parts by weight of titanium dioxide based on 100 parts by weight of calcium carbonate). Moreover, when the product was observed on a scanning electron microscope, titanium dioxide was provided on the surface of spindle-shape calcium carbonate having a major axis of 2.0 $\mu$m and a minor axis of 0.4 $\mu$m and independent titanium dioxide particles were not confirmed.

Example 2

Titanium dioxide-calcium carbonate composite particles were obtained by conducting operations similar to those in Example 1 with the exception that the amount of titanium dioxide to be added was changed to 20.0 g.

When the resulting product was subjected to chemical analysis, the content of titanium dioxide was found to be 8.7% by weight (9.6 parts by weight of titanium dioxide based on 100 parts by weight of calcium carbonate). Moreover, when the product was observed on a scanning electron microscope, titanium dioxide was provided on the surface of spindle-shape calcium carbonate having a major axis of 2.0 $\mu$m and a minor axis of 0.4 $\mu$m and independent titanium dioxide particles were not confirmed.

Example 3

Titanium dioxide-calcium carbonate composite particles were obtained by conducting operations similar to those in Example 1 with the exception that the amount of titanium dioxide to be added was changed to 60.0 g.

When the resulting product was subjected to chemical analysis, the content of titanium dioxide was found to be 26.5% by weight (36.4 parts by weight of titanium dioxide based on 100 parts by weight of calcium carbonate). Moreover, when the product was observed on a scanning electron microscope, titanium dioxide was provided on the surface of spindle-shape calcium carbonate having a major axis of 2.0 $\mu$m and a minor axis of 0.4 $\mu$m and independent titanium dioxide particles were not confirmed.

Example 4

Titanium dioxide-calcium carbonate composite particles were obtained by conducting operations similar to those in Example 1 with the exception that titanium dioxide was changed to atanase-type titanium dioxide (A-100 manufactured by Ishihara Sangyo) having an average diameter of 0.15 $\mu$m and the amount was 20.0 g.

When the resulting product was subjected to chemical analysis, the content of titanium dioxide was found to be 8.6% by weight (9.6 parts by weight of titanium dioxide based on 100 parts by weight of calcium carbonate). Moreover, when the product was observed on a scanning electron microscope, titanium dioxide was provided on the surface of spindle-shape calcium carbonate having a major axis of 2.0 $\mu$m and a minor axis of 0.4 $\mu$m and independent titanium dioxide particles were not confirmed.

Example 5

Titanium dioxide-calcium carbonate composite particles were obtained by conducting operations similar to those in Example 4 with the exception that the amount of titanium dioxide to be added was changed to 30.0 g.

When the resulting product was subjected to chemical analysis, the content of titanium dioxide was found to be 13.0% by weight (15.1 parts by weight of titanium dioxide based on 100 parts by weight of calcium carbonate). Moreover, when the product was observed on a scanning electron microscope, titanium dioxide was provided on the surface of spindle-shape calcium carbonate having a major axis of 2.0 $\mu$m and a minor axis of 0.4 $\mu$m and independent titanium dioxide particles were not confirmed.

Example 6

A slaked lime slurry was prepared by conducting operations similar to Example 1. Thereafter, the slurry temperature was controlled to 30° C. and then carbon dioxide was introduced with stirring in a rate of 0.35 L/minute to start carbonation. At the time when 5 minutes were passed from the start of carbonation (carbonation rate of 5%), 45.0 g of rutile-type titanium dioxide having an average particle diameter of 0.25 $\mu$m (CR-50 manufactured by Ishihara Sangyo) was added thereto and the carbonation was continued. The reaction was terminated when pH of the slurry reached 7.

When the resulting product was subjected to chemical analysis, the content of titanium dioxide was found to be 17.0% by weight (20.5 parts by weight of titanium dioxide based on 100 parts by weight of calcium carbonate). Moreover, when the product was observed on a scanning electron microscope, titanium dioxide was provided on the surface of spindle-shape calcium carbonate having a major axis of 2.0 $\mu$m and a minor axis of 0.4 $\mu$m and independent titanium dioxide particles were not confirmed.

Example 7

Titanium dioxide-calcium carbonate composite particles were obtained by conducting operations similar to those in Example 6 with the exception that the addition of titanium dioxide was conducted when 30 minutes were passed from the start of carbonation (carbonation rate of 29%).

When the resulting product was subjected to chemical analysis, the content of titanium dioxide was found to be 17.0% by weight (20.5 parts by weight of titanium dioxide based on 100 parts by weight of calcium carbonate). Moreover, when the product was observed on a scanning electron microscope, titanium dioxide was provided on the surface of spindle-shape calcium carbonate having a major axis of 2.0 $\mu$m and a minor axis of 0.4 $\mu$m and independent titanium dioxide particles were not confirmed.

Example 8

Titanium dioxide-calcium carbonate composite particles were obtained by conducting operations similar to those in Example 6 with the exception that the amount of titanium dioxide was changed to 20.0 g and the addition of titanium dioxide was conducted when 60 minutes were passed from the start of carbonation (carbonation rate of 58%).

When the resulting product was subjected to chemical analysis, the content of titanium dioxide was found to be 8.7% by weight (9.6 parts by weight of titanium dioxide based on 100 parts by weight of calcium carbonate). Moreover, when the product was observed on a scanning electron microscope, titanium dioxide was provided on the surface of spindle-shape calcium carbonate having a major axis of 2.0

µm and a minor axis of 0.4 µm and independent titanium dioxide particles were not confirmed.

Example 9

Titanium dioxide-calcium carbonate composite particles were obtained by conducting operations similar to those in Example 6 with the exception that the amount of titanium dioxide was changed to 6.0 g and the addition of titanium dioxide was conducted when 100 minutes were passed from the start of carbonation (carbonation rate of 97%).

When the resulting product was subjected to chemical analysis, the content of titanium dioxide was found to be 2.5% by weight (2.6 parts by weight of titanium dioxide based on 100 parts by weight of calcium carbonate). Moreover, when the product was observed on a scanning electron microscope, titanium dioxide was provided on the surface of spindle-shape calcium carbonate having a major axis of 2.0 µm and a minor axis of 0.4 µm and independent titanium dioxide particles were not confirmed.

Comparative Example 1

By conducting operations similar to Example 1, 2.0 L of a slaked lime slurry having a concentration of 80 g/L was prepared and then carbon dioxide was introduced thereto in a rate of 0.35 L/minute to carry out carbonation. At the time when pH of the slurry reached 7 and the carbonation was completed, 10.0 g of rutile-type titanium dioxide having an average particle diameter of 0.25 µm (CR-50 manufactured by Ishihara Sangyo) was added thereto and stirring was continued for 30 minutes under introducing carbon dioxide. When the product was observed on a scanning electron microscope, spindle-shape calcium carbonate having a major axis of 2.0 µm and a minor axis of 0.4 µm and titanium dioxide particles were observed but they were independent of each other and present as a simple mixture.

Comparative Example 2

Titanium dioxide-calcium carbonate composite particles were obtained by conducting operations similar to those in Example 1 with the exception that the amount of titanium dioxide to be added was changed to 0.15 g.

When the resulting product was subjected to chemical analysis, the content of titanium dioxide was found to be 0.07% by weight (0.07 parts by weight of titanium dioxide based on 100 parts by weight of calcium carbonate). Moreover, when the product was observed on a scanning electron microscope, it was confirmed that very little amount of titanium dioxide was provided on the surface of spindle-shape calcium carbonate having a major axis of 2.0 µm and a minor axis of 0.4 µm.

Comparative Example 3

Spindle-shape calcium carbonate was obtained by conducting operations similar to those in Example 1 without adding titanium dioxide. When the resulting product was subjected to chemical analysis, the content of titanium dioxide was found to be 0.001% by weight or less. Moreover, when the product was observed on a scanning electron microscope, spindle-shape calcium carbonate having a major axis of 2.0 µm and a minor axis of 0.4 µm was only confirmed.

With regard to Application Examples wherein papers filled with composite particles were manufactured:

Papers filled with composite particles and papers filled with no composite particles were produced and characteristic properties such as opacity were compared.

Application Examples 1 to 3

Using titanium dioxide-calcium carbonate composite particles obtained in Examples 1 to 3 as fillers, paper stock containing 14.5 parts by weight of the composite particles, 85.4 parts by weight of a mixed pulp (c.s.f.=450 ml) of 70% LBKP and 30% NBKP, and 0.1 part by weight of 5% solution of a cationic organic polymer flocculant were prepared and papers filled with composite particles were prepared by means of a square sheet machine, the papers having a weighing of about 70 g/m² and a filler-filling rate of about 10% by weight were manufactured.

Application Comparative Example 1

An inorganic filled paper was manufactured under conditions similar to those in Application Examples 1 to 3 with the exception that only spindle-type calcium carbonate obtained in Comparative Example 3 was used as a filler.

Application Comparative Example 2

An inorganic filled paper was manufactured under conditions similar to those in Application Examples 1 to 3 with the exception that the product obtained in Comparative Example 2 was used as a filler.

Application Comparative Examples 3 to 5

Inorganic filled papers were manufactured under conditions similar to those in Application Examples 1 to 3 with the exception that mixtures of titanium dioxide (CR-50 manufactured by Ishihara Sangyo) and calcium carbonate (the one obtained in Comparative Example 3) were used as fillers. By the way, the mixing ratios of titanium dioxide and calcium carbonate are as shown in Table 1.

TABLE 1

| | Filler | | | Physical properties and composition of inorganic filled paper | | | | | Yield ratio of titanium dioxide % |
|---|---|---|---|---|---|---|---|---|---|
| | | Component of filler | | | | Filling component | | | |
| | Kind of filler | Calcium carbonate wt % | Titanium dioxide wt % | Weighing g/m² | Filling rate wt % | Calcium carbonate wt % | Titanium dioxide wt % | Opacity — | |
| Application Example 1 | Composite particles of Example 1 | 96.6 | 2.5 | 70.8 | 10.9 | 10.4 | 0.27 | 83.8 | 74.5 |
| Application Example 2 | Composite particles of Example 2 | 90.7 | 8.7 | 70.2 | 10.7 | 9.5 | 0.99 | 85.1 | 78.5 |

TABLE 1-continued

| | Filler | | | Physical properties and composition of inorganic filled paper | | | | Yield ratio of titanium dioxide % |
|---|---|---|---|---|---|---|---|---|
| | | Component of filler | | | | Filling component | | |
| | Kind of filler | Calcium carbonate wt % | Titanium dioxide wt % | Weighing g/m² | Filling rate wt % | Calcium carbonate wt % | Titanium dioxide wt % | Opacity |
| Application Example 3 | Composite particles of Example 3 | 72.8 | 26.5 | 70.4 | 10.6 | 7.7 | 2.8 | 87.6 | 72.9 |
| Application Comparative Example 1 | Calcium carbonate of Comparative Example 3 | 98.9 | <0.001 | 70.9 | 10.9 | 10.6 | — | 82.6 | — |
| Application Comparative Example 2 | Product of Comparative Example 2 | 98.8 | 0.07 | 70.7 | 10.8 | 10.5 | 0.008 | 82.6 | 78.8 |
| Application Comparative Example 3 | Mixture of titanium dioxide and calcium carbonate | 94.1 | 5.0 | 70.9 | 10.4 | 9.7 | 0.37 | 83.0 | 51.0 |
| Application Comparative Example 4 | Mixture of titanium dioxide and calcium carbonate | 85.4 | 14.0 | 70.4 | 10.7 | 9.5 | 1.00 | 83.8 | 49.3 |
| Application Comparative Example 5 | Mixture of titanium dioxide and calcium carbonate | 59.3 | 40.0 | 70.5 | 10.1 | 7.3 | 2.66 | 85.5 | 45.9 |

Figure 1:
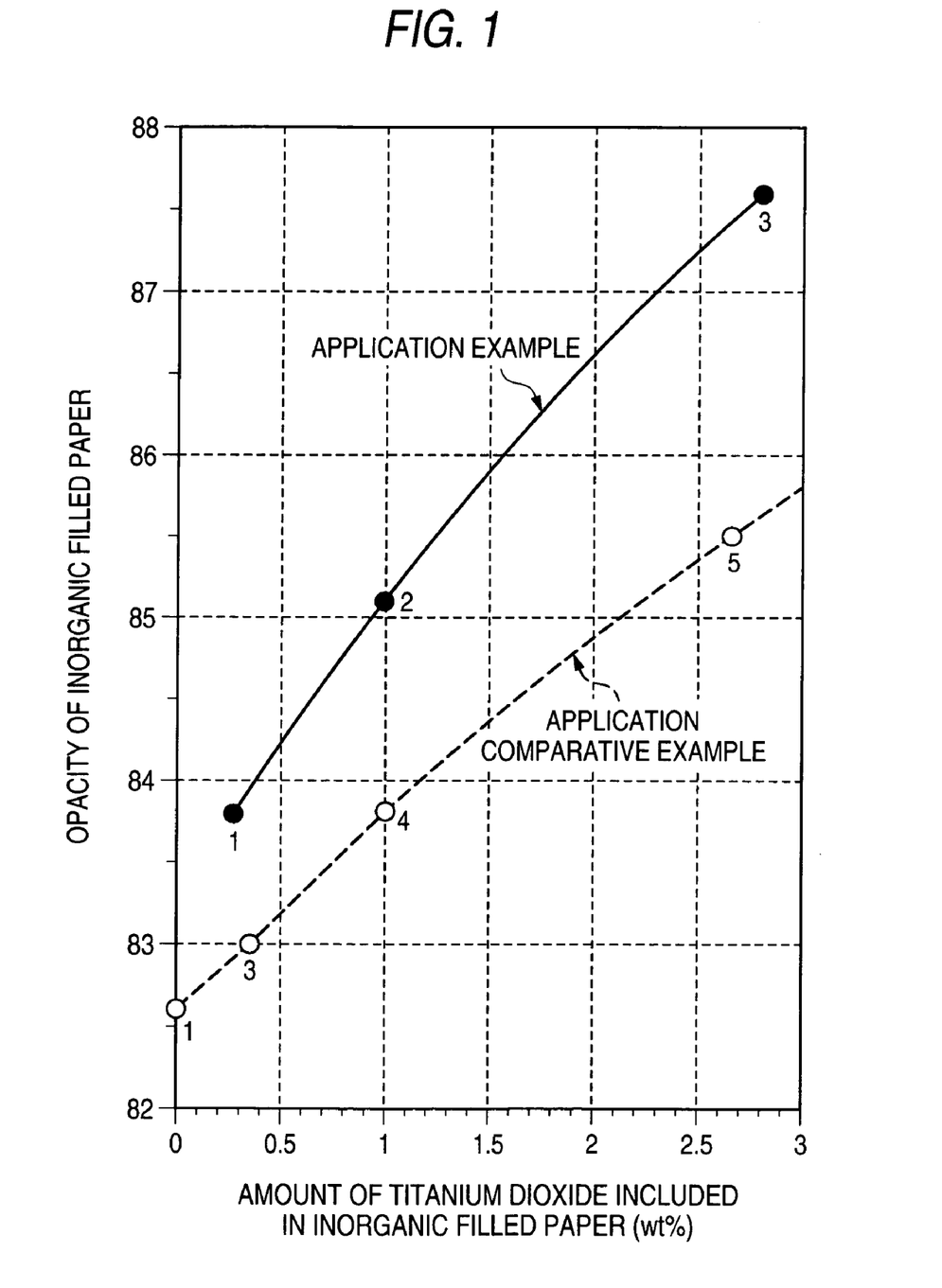
FIG. 1 shows the relationship between the amount of titanium dioxide filled in paper and opacity.

Evaluation of Characteristic Properties of Filled Papers:

The results of physical property measurement and chemical analysis of papers filled with the inorganic substances obtained in Application Examples 1 to 3 and Application Comparative Examples 1 to 5 are shown in Table 1 together with the compositions of fillers used, and the relationship between the amount of titanium dioxide filled and opacity is shown in FIG. 1. By the way, the opacity was measured in accordance with JIS P8138 "testing method for opacity of paper".

As easily understood from FIG. 1, the papers filled with the inorganic substances produced using the titanium dioxide-calcium carbonate composite particles of the present invention as fillers have a high opacity per unit weight of titanium dioxide as compared with the papers obtained using a simple mixture of titanium dioxide and calcium carbonate and thus the composite materials of the present invention can efficiently realize the opacity-enhancing effect of titanium dioxide.

With regard to preparation of coating agents for paper making containing composite particles and Application Examples wherein coated papers are manufactured using the same:

Coating agents containing the composite particles of the present invention and coating agents containing no composite particles were prepared, then coated papers were produced using both coating agents, respectively, and characteristic properties such as opacity of both coated papers were compared.

Application Examples 4 and 5

Using the composite particles obtained in Example 4 and 5 as pigments, coating agents for paper making having a pH of 9.5 and a solid mass concentration of 45% by weight were prepared by dispersing 100 parts by weight of the composite particles, 10 parts by weight of styrene-butadiene latex, 0.2 part by weight (all as solid mass) of a soda polyacrylate-type dispersant into ion-exchange water by means of a cowless dispersing machine and then adding an appropriate amount of aqueous ammonia and ion-exchange water. Subsequently, the coating agents thus prepared were applied onto only one surface of each base paper having a base weight of 70 g/m² by means of an automatic coating apparatus (manufactured by Tester Sangyo) and then the whole was dried in a drum dryer to manufacture coated papers having a coated layer of about 12 g/m².

Application Comparative Example 6

A coating agent for paper making was prepared in a similar manner to Application Examples 4 and 5 with the exception that the spindle-shape calcium carbonate obtained in Comparative Example 3 was used, and a coated paper was manufactured under conditions similar to those in Application Examples 4 and 5.

Application Comparative Example 7

A coating agent for paper making was prepared in a similar manner to Application Examples 4 and 5 with the exception that the product obtained in Comparative Example 2 was used as a pigment, and a coated paper was manufactured under conditions similar to those in Application Examples 4 and 5.

Application Comparative Examples 8 and 9

Coating agents for paper making were prepared in a similar manner to Application Examples 4 and 5 with the exception that mixtures of titanium dioxide (A-100 manufactured by Ishihara Sangyo) and calcium carbonate (the one obtained in Comparative Example 3) each obtained by mixing the compounds in a predetermined ratio were used as a pigment, and coated papers were manufactured under conditions similar to those in Application Examples 4 and 5.

Figure 2:
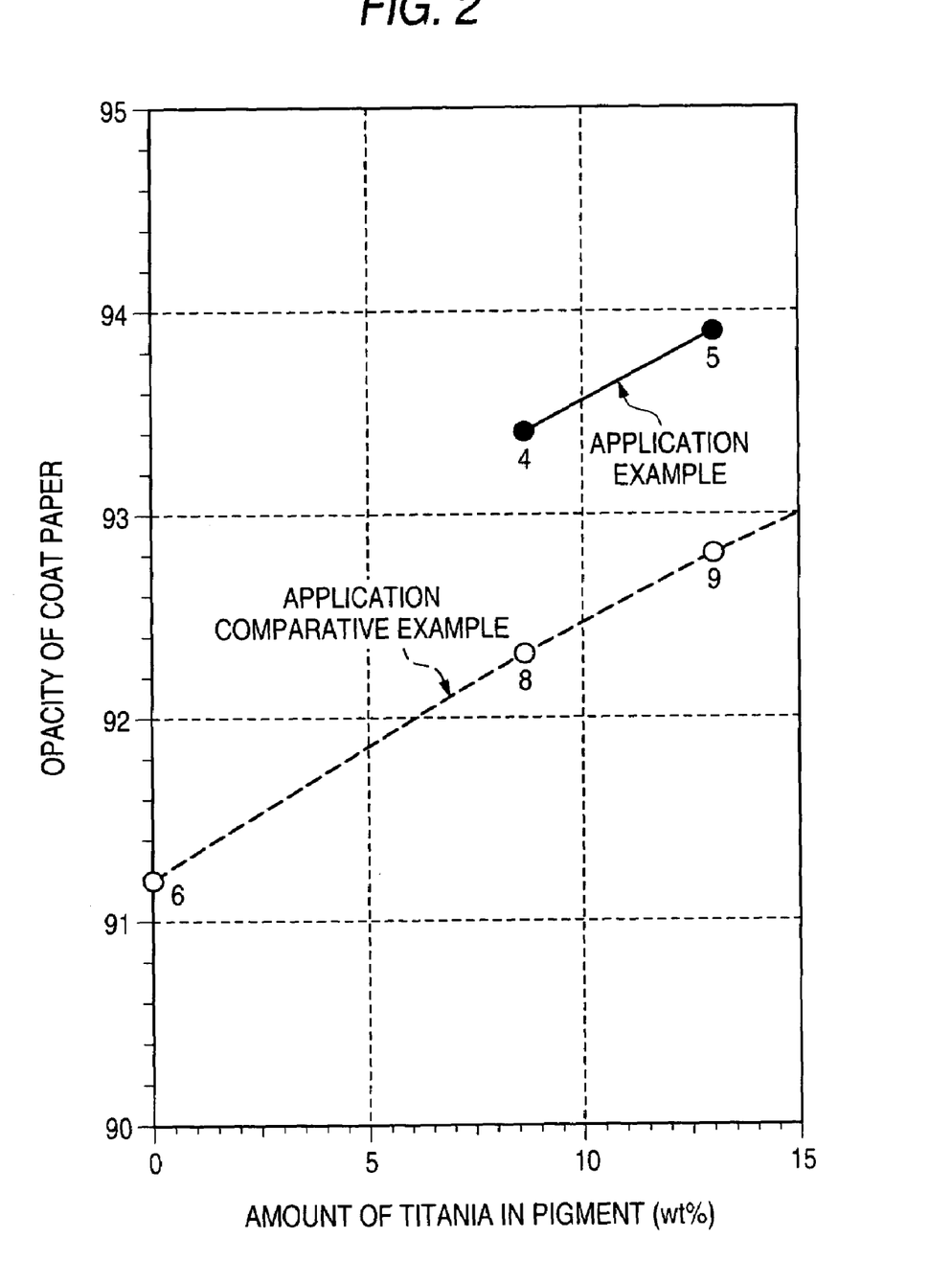
FIG. 2 shows the relationship between the amount of titanium dioxide applied onto paper and opacity.

Evaluation of Characteristic Property of Coated Papers:

The physical property of the coated papers obtained in Application Examples 4 to 5 and Application Comparative Examples 6 to 9 are shown in Table 2 together with the compositions of the coating agents and coated amount used, and the relationship between the amount of titanium dioxide applied and opacity is shown in FIG. 2. By the way, the opacity was measured in accordance with JIS P8138 in a similar manner to the case of the papers filled with inorganic substances.

TABLE 2

| | Pigment | | Physical property and composition of coated paper | | |
|---|---|---|---|---|---|
| | | Component of pigment | | | |
| | Kind of pigment | Calcium carbonate wt % | Titanium dioxide wt % | Coated amount g/m² | Opacity — |
| Application Example 4 | Composite particles of Example 4 | 90.7 | 8.6 | 12.0 | 93.4 |
| Application Example 5 | Composite particles of Example 5 | 86.2 | 13.0 | 11.9 | 93.9 |
| Application Comparative Example 6 | Calcium carbonate of Comparative Example 3 | 98.9 | <0.001 | 12.0 | 91.2 |
| Application Comparative Example 7 | Product of Comparative Example 2 | 98.8 | 0.07 | 12.1 | 91.3 |
| Application Comparative Example 8 | Mixture of titanium dioxide and calcium carbonate | 90.7 | 8.6 | 12.2 | 92.3 |
| Application Comparative Example 9 | Mixture of titanium dioxide and calcium carbonate | 86.2 | 13.0 | 12.0 | 92.8 |

As easily understood from Table 2 the coated papers produced using coating agents containing the titanium dioxide-calcium carbonate composite particles of the present invention as pigments have a high opacity per unit weight of titanium dioxide as compared with the cases using coating agents of simple mixtures of titanium dioxide and calcium carbonate and thus the papers can efficiently realize the opacity-enhancing effect of titanium dioxide.

With regard to preparation of fillers for polyethylene comprising composite particles and Application Examples wherein polyethylene sheets are manufactured using the same:

Fillers comprising the composite particles of the present invention and fillers containing no composite particles were prepared, then polyethylene sheets were produced using both fillers, respectively, and properties such as opacity of both polyethylene sheets were compared.

Application Example 6

After 1 kg of the slurry of titanium dioxide-calcium carbonate composite particles (solid mass concentration of 13% by weight) obtained in Example 1 had been warmed to 60° C., a solution of 3.9 g of sodium salt of mixed fatty acids dissolved in ion-exchange water was added thereto, followed by 10 minutes of stirring. Thereafter, the mixture was dehydrated and dried to obtain fatty acid-treated titanium dioxide-calcium carbonate composite particles. Using the resulting fatty acid-treated titanium dioxide-calcium carbonate composite particles as filler, a polyethylene sheet was manufactured under the following conditions.

Hundred part by weight of high density polyethylene, 30 parts by weight of the fatty acid-treated titanium dioxide-calcium carbonate composite particles, 0.05 part by weight of an antioxidant (n-octadesyl-3-(4'-3',5'-di-t-butylphenyl) propionate), and 0.05 part by weight of a neutralizing agent (calcium stearate) were thoroughly mixed and the mixture was pelletized by means of a twin-screw extruder set at 230° C.

The resulting pellets were molded into a sheet having a thickness of 600 μm by T-die process and the sheet was drawn at 130° C. 1.2 times in lengthwise direction and 5 times in crosswise direction to manufacture a polyethylene sheet having a thickness of 100 μm, which was filled with titanium dioxide-calcium carbonate composite particles.

Application Comparative Example 10

Fatty acid-treatment for filler preparation and manufacture of a polyethylene sheet were carried out by conducting operations similar to those in Application Example 6 with the exception that a mixture of titanium dioxide (CR-50 manufactured by Ishihara Sangyo) and calcium carbonate (the one obtained in Comparative Example 3) in the same ratio in Example 1 was used as a raw material for a filler.

Application Comparative Example 11

Fatty acid-treatment for filler preparation and manufacture of a polyethylene sheet were carried out by conducting operations similar to those in Application Example 6 with the exception that the spindle-shape calcium carbonate obtained in Comparative Example 3 alone was used as a filler.

Evaluation of Characteristic Property of Polyethylene Sheets:

The opacity of the polyethylene sheets obtained in Application Example 6 and Application Comparative Examples 10 and 11 are shown in Table 3 together with the compositions of the fillers used. By the way, the opacity was measured in accordance with JIS P8138 without change in a similar manner to the cases of the papers filled with inorganic substances. As easily understood from Table 3, a polyethylene sheet produced using the titanium dioxide-calcium carbonate composite particles of the present invention as a filler have a high opacity per unit weight of titanium dioxide as compared with the case using a simple mixture of titanium dioxide and calcium carbonate as a filler and thus the sheet can efficiently realize the opacity-enhancing effect of titanium dioxide.

TABLE 3

| | | Component of filler | | |
|---|---|---|---|---|
| | Kind of pigment | Titanium dioxide wt % | Calcium carbonate wt % | Opacity — |
| Application Example 6 | Composite particles of Example 1 (fatty acid-treated) | 2.5 | 96.6 | 86.4 |
| Application Comparative Example 10 | Mixture of titanium dioxide and Calcium carbonate (fatty acid-treated) | 2.5 | 96.6 | 85.1 |

TABLE 3-continued

| | | Component of filler | | |
|---|---|---|---|---|
| | Kind of pigment | Titanium dioxide wt % | Calcium carbonate wt % | Opacity |
| Application Comparative Example 11 | Calcium carbonate of Comparative Example 3 (fatty acid-treated) | <0.001 | 98.9 | 83.7 |

INDUSTRIAL APPLICABILITY

The titanium dioxide-calcium carbonate composite particles of the present invention are particles wherein titanium dioxide particles having an average particle diameter of 0.1 to 0.5 μm are directly provided on the surface of synthetic calcium carbonate particles and which can efficiently realize the opacity-enhancing effect inherent in titanium dioxide as compared with a simple mixture. Moreover, since titanium dioxide particles are provided on coarser calcium carbonate particles and both particles are complicated, the composite particles have an effect of solving problems such as low yield ratio owing to the fineness of titanium dioxide particles and viscosity increase which occurs when they are incorporated into a coating agent.

In particular, when the composite particles are applied to paper making, titanium dioxide particles do not flocculate each other in the paper forming step or coating step and can be homogeneously distributed in paper or in a coated layer, so that it is possible to realize more efficiently the opacity-enhancing effect inherent in titanium dioxide added.

By the way, the composite particles of the present invention are effective for enhancing opacity of plastics, rubbers, paints, and the like which are fields other than the above paper making, and at that time, similar actions and effects can be attained as the case of the above paper making.

Furthermore, in the present invention, titanium dioxide particles can be directly, i.e., without using any binder such as an organic binder, fixed onto the surface of calcium carbonate by adding titanium dioxide particles in a carbonation step. Accordingly, when the composite particles in paper or plastics are used as a filler or coating agent, the composite particles have a characteristic property of exhibiting no adverse effect which is shown in the presence of an organic binder or the like even when they are subjected to a treatment such as heating, hydrolysis, or the like. Moreover, since titanium dioxide particles are provided not inside the calcium carbonate but on the surface, the particles can contribute extremely effectively to the enhancement of opacity.

What is claimed is:

1. A titanium dioxide-calcium carbonate composite particle, which comprises a synthetic carbonate particle having directly provided thereon titanium dioxide particles having an average particle diameter of 0.1 to 0.5 μm, wherein the synthetic calcium carbonate particle is a spindle-shape calcium carbonate particle.

2. The titanium dioxide-calcium carbonate composite particle according to claim 1, wherein the titanium dioxide provided on the synthetic calcium carbonate is used in an amount of 0.1 part by weight or more based on 100 parts by weight of the synthetic calcium carbonate.

3. A process for producing a titanium dioxide-calcium carbonate composite particle, which comprises adding titanium dioxide particles to synthetic calcium carbonate during a carbonation step at a production step of the synthetic calcium carbonate to thereby directly provide the titanium dioxide on the calcium carbonate, wherein the synthetic calcium carbonate particle is a spindle-shape calcium carbonate particle and wherein the titanium dioxide has an average particle diameter of from 0.1 to 0.5 μm.

4. The process for producing a titanium dioxide-calcium carbonate composite particle according to claim 3, wherein the titanium dioxide is added so as to be 0.1 part by weight or more based on 100 parts by weight of the produced synthetic calcium carbonate.

5. A composition comprising an inorganic pigment or filler, and the titanium dioxide-calcium carbonate composite particles according to claim 1 or 2.

6. The composition according to claim 5, which is a coating agent for paper making comprising the titanium dioxide-calcium carbonate composite particle in an amount of 1% by weight or more based on the inorganic pigment.

7. The composition according to claim 5, which is a paper comprising the titanium dioxide-calcium carbonate composite particle in an amount of 1% by weight or more based on the inorganic filler.

8. The composition according to claim 5, which is a coated paper comprising the titanium dioxide-calcium carbonate composite particle in an amount of 1% by weight or more based on the inorganic pigment.

9. A paper comprising an inorganic filler and the titanium dioxide calcium carbonate composite particle according to claim 1 or 2, wherein an amount of the titanium dioxide-calcium carbonate composite particle is 1% by weight or more based on the inorganic filler.

10. A coated paper, which comprises an inorganic pigment and a titanium dioxide-calcium carbonate composite particle disposed thereon, wherein the titanium dioxide-calcium carbonate composite particle is the titanium dioxide-calcium carbonate composite particle according to claim 1 or 2, and an amount of the titanium dioxide-calcium carbonate composite particle is 1% by weight or more based on the inorganic pigment.

11. A composition comprising an inorganic pigment or filler, and the titanium dioxide-calcium carbonate composite particles produced by the process according to claim 3.

12. A paper comprising an inorganic filler and the titanium dioxide-calcium carbonate composite particle produced by the process according to claim 3, wherein an amount of the titanium dioxide-calcium carbonate composite particle is 1% by weight or more based on the inorganic filler.

13. A coated paper, which comprises an inorganic pigment and a titanium dioxide-calcium carbonate composite particle disposed thereon, wherein the titanium dioxide-calcium carbonate composite particle is the titanium dioxide-calcium carbonate composite particle produced by the process according to claim 3, and an amount of the titanium dioxide-calcium carbonate composite particle is 1% by weight or more based on the inorganic pigment.

* * * * *